(12) United States Patent
Chou et al.

(10) Patent No.: US 8,837,908 B2
(45) Date of Patent: Sep. 16, 2014

(54) SYSTEMS AND METHODS FOR PERFORMING SECURE PLAYBACK OF MEDIA CONTENT

(75) Inventors: Hung-Te Chou, Taipei (TW); Hung-Te Lin, Taipei (TW); Yu-Tung Chuang, Taoyuan County (TW)

(73) Assignee: Cyberlink Corp., Taipei (TW)

( * ) Notice: Subject to any disclaimer, the term of this patent is extended or adjusted under 35 U.S.C. 154(b) by 1298 days.

(21) Appl. No.: 12/349,046

(22) Filed: Jan. 6, 2009

(65) Prior Publication Data

US 2010/0172630 A1  Jul. 8, 2010

(51) Int. Cl.

| | |
|---|---|
| *H04N 9/80* | (2006.01) |
| *H04N 5/917* | (2006.01) |
| *H04N 5/93* | (2006.01) |
| *H04N 7/167* | (2011.01) |
| *G06F 21/00* | (2013.01) |
| *H04N 21/4143* | (2011.01) |
| *H04N 21/432* | (2011.01) |
| *H04N 21/8355* | (2011.01) |
| *G11B 20/00* | (2006.01) |
| *H04N 5/913* | (2006.01) |
| *H04N 21/254* | (2011.01) |
| *H04N 21/835* | (2011.01) |
| *H04N 21/426* | (2011.01) |
| *H04N 21/4627* | (2011.01) |

(52) U.S. Cl.
CPC ......... *H04N 21/835* (2013.01); *H04N 21/4143* (2013.01); *H04N 21/4325* (2013.01); *H04N 21/8355* (2013.01); *G11B 20/00246* (2013.01); *H04N 5/913* (2013.01); *G11B 2220/2562* (2013.01); *H04N 21/2541* (2013.01); *G11B 20/00086* (2013.01); *G11B 20/0021* (2013.01); *G11B 20/00427* (2013.01); *H04N 21/42623* (2013.01); *H04N 21/4627* (2013.01); *H04N 2005/91364* (2013.01); *G11B 20/00362* (2013.01); *Y10S 705/901* (2013.01); *Y10S 705/905* (2013.01)
USPC ........... 386/252; 386/259; 386/355; 386/357; 380/201; 380/210; 705/51; 705/57; 705/901; 705/905

(58) Field of Classification Search
CPC ................. G11B 20/00086; G11B 2220/2562; H04N 5/913; H04N 2005/91364
See application file for complete search history.

(56) References Cited

U.S. PATENT DOCUMENTS 5,247,363 A * 9/1993 Sun et al. ........................ 348/616
7,634,171 B2 * 12/2009 Coffin, III ...................... 386/345
(Continued)

OTHER PUBLICATIONS

Hilty et al., "Enforcement for Usage Control—An Overview of Control Mechanisms", Oct. 2006, DoCoMo Euro-Labs, version 1.1, pp. 1-48.*

(Continued)

Primary Examiner — Hung Dang
(74) Attorney, Agent, or Firm — McClure, Qualey & Rodack, LLP (57) ABSTRACT

Systems and methods for performing secure playback of media content are described. One embodiment, among others, is a method for performing secure playback of video in a hardware protection module. The method comprises receiving media content from a media player comprising video data, audio data, and navigation data. The method further comprises receiving digital rights management (DRM) information relating to the media content, removing a portion of the video data from the media content, forwarding the audio data, navigation data, and a remaining portion of the video data to the media player for decoding, and decoding, in the hardware protection module, the portion of the video data.

23 Claims, 8 Drawing Sheets

(56) References Cited

U.S. PATENT DOCUMENTS

| | | |
|---|---|---|
| 2002/0057897 A1* | 5/2002 | Yamaguchi .................. 386/46 |
| 2005/0105886 A1* | 5/2005 | Abelard et al. .............. 386/94 |
| 2005/0192904 A1* | 9/2005 | Candelore .................... 705/51 |
| 2005/0207569 A1* | 9/2005 | Zhang et al. ................. 380/28 |
| 2006/0021068 A1* | 1/2006 | Xu et al. ....................... 726/30 |
| 2006/0275021 A9* | 12/2006 | Kikuchi et al. .............. 386/95 |
| 2007/0067244 A1* | 3/2007 | Jin et al. ....................... 705/59 |
| 2007/0100771 A1 | 5/2007 | Eckleder |
| 2007/0185813 A1* | 8/2007 | Shear et al. .................. 705/51 |
| 2008/0052541 A1* | 2/2008 | Ginter et al. ................ 713/194 |
| 2008/0148063 A1 | 6/2008 | Hanko |

OTHER PUBLICATIONS

"Advanced Access Content System (AACS), Pre-recorded Video Book," Nov. 29, 2007, chap. 3.

* cited by examiner

SYSTEMS AND METHODS FOR PERFORMING SECURE PLAYBACK OF MEDIA CONTENT

TECHNICAL FIELD

The present disclosure generally relates to multimedia content and more particularly, relates to performing secure playback of media content.

BACKGROUND

Over the years, digital video content has gained increasing popularity with consumers. With the vast amount of audio and video content available to consumers through broadcast, cable, on-demand, fixed media, and other available sources of multimedia content, consumers have access to a wide range of content and programming. Furthermore, an increasing amount of video content is becoming available over the Internet and other data services in the form of downloadable content.

Generally, video content can be stored in any number of common formats such as MPEG-1, MPEG-2, or DV (digital video), for example. Likewise, audio content may be stored in any number of common digital formats such as MP3, WAV, or MPEG Audio, for example. The availability of multimedia content in a vast array of digital formats has helped make distribution of multimedia content easier because of the high degree of portability. Unfortunately, piracy of audio/visual works has also proliferated over the years as technology continues to facilitate the distribution of multimedia content. Because of the ease in accessing and copying multimedia content over the Internet for example, video and audio piracy continues to be an ongoing problem.

In response to unauthorized copying and distribution of multimedia content, publishers and authors of audio/visual works have relied on technologies that control access to digital content. The term Digital Rights Management (DRM) generally describes technologies used to achieve restricted access to multimedia content. Such DRM technologies are based on a large variety of technologies, including multimedia player software that control access to content using encryption. However, one apparent shortcoming of using software applications to control access to encrypted content is that such software can be accessed and reversed-engineered in many cases.

Given that personal computers generally operate in an open environment, it can be a challenge to protect multimedia content. In some instances, software code can be moved from a protected area of memory to an unprotected memory where the code is then dissected and analyzed. It is also possible to analyze a multimedia software application residing in open memory to determine the exact memory location where encryption keys are stored. With the proper tools, it is then possible to dump blocks of memory holding these encryption keys to gain access to protected content. Thus, software approaches to protecting encrypted multimedia content still suffer from the same apparent shortcomings as unprotected content.

SUMMARY

Briefly described, one embodiment, among others, is a method for performing secure playback of video in a hardware protection module. The method comprises receiving media content from a media player comprising video data, audio data, and navigation data. The method further comprises receiving digital rights management (DRM) information relating to the media content, removing a portion of the video data from the media content, forwarding the audio data, navigation data, and a remaining portion of the video data to the media player for decoding, and decoding, in the hardware protection module, the portion of the video data.

Another embodiment includes a system for performing secure playback of video. The system comprises a media player configured to receiving media content and digital rights management (DRM) information relating to the media content. The media player comprises a media reader for reading the media content, a demultiplexer for partitioning an input media stream to generate an output comprising navigation data, audio data, and video header information, and a video decoder for decoding the video header information. In accordance with such embodiments, the system further comprises a hardware protection module for receiving the media content and returning a portion of the media content to the media player for decoding.

Another embodiment includes a system for performing distributed playback of media content. The system comprises a program stored on a computer readable medium for receiving media content and digital rights management (DRM) information relating to the media content, wherein the program is configured to perform playback of an audio portion of the media content. The system further comprises a hardware protection module configured to receive the media content and return a portion of the media content back to the program for playback of the audio portion, wherein the hardware protection module is further configured to perform playback of a video portion of the media content.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
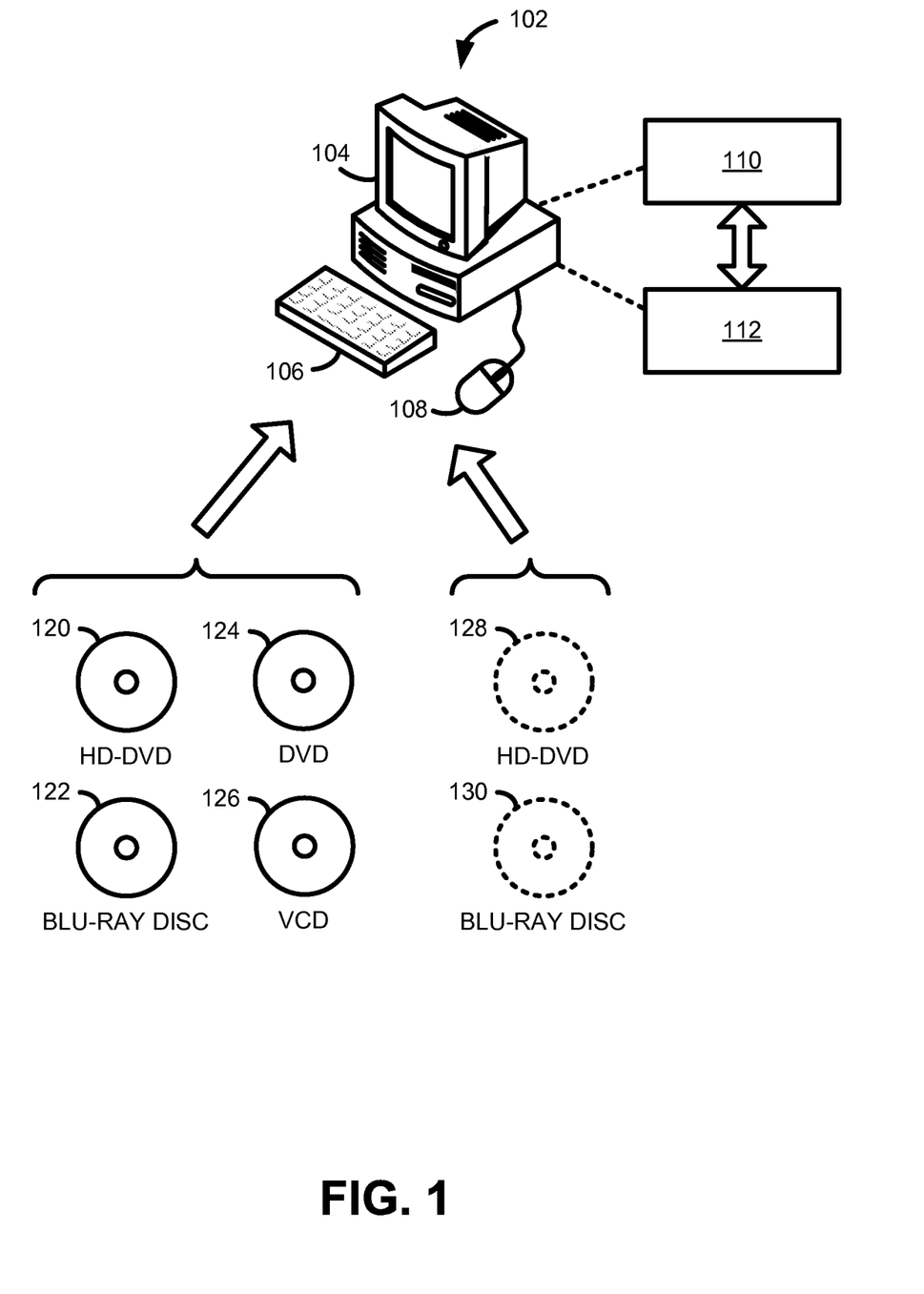
FIG. 1 depicts a top-level diagram of an apparatus for performing secure playback of media content.

Reference is made to FIG. 1, which depicts a top-level diagram of a system for performing secure playback of media content. For some embodiments, a system for identifying scenes within a video may be incorporated in a playback apparatus 102, which may be, for example, a computer workstation or a laptop. The playback apparatus 102 may include a display 104 and input devices such as a keyboard 106 and a mouse 108. Furthermore, the playback apparatus 102 may be configured to provide a user interface, which a user utilizes to select one or more movie titles to view.

As illustrated in FIG. 1, the playback apparatus 102 is further configured to read multimedia content stored in various formats and stored on various types of storage media. As non-limiting examples, the playback apparatus 102 is capable of reading media content encoded in such formats that include, but are not limited to, Digital Video Disc (DVD) 124, video CD (VCD) 126, High Definition DVD (HD-DVD) 120, and BLU-RAY Disc 122. In accordance with exemplary embodiments, the playback apparatus 102 may also be configured to read multimedia content from managed copies of an HD-DVD 128 or a BLU-RAY Disc 130, for example. The playback apparatus 102 is configured to receive the media content 120, 122, 124, 126, 128, 130 and output the media content for a user to view.

The phrase "managed copy" generally refers to authorized copies of multimedia content. These authorized copies are protected by AACS (Advanced Access Content System), which is a standard relating to content distribution and digital rights management. The playback apparatus 102 is configured to obtain authorization for creating or downloading a managed copy by contacting a designated server on the Internet, for example. To protect against unauthorized distribution of media content, managed copies are protected by DRM (digital rights management) such that uncontrolled copying is prevented. In accordance with various embodiments, the playback apparatus 102 may utilize managed copies for different purposes such as creating an exact duplicate of a movie title onto a recordable disc as a backup, creating a full-resolution copy for storage on a media server, and creating a scaled-down version of a movie title for playback on a portable device. As described earlier, the media file may be encoded in any of a variety of audio/video formats including, but not limited to: VOB (video object) files, MOV files, AVI files, WMV files, and MPEG files.

Figure 6:
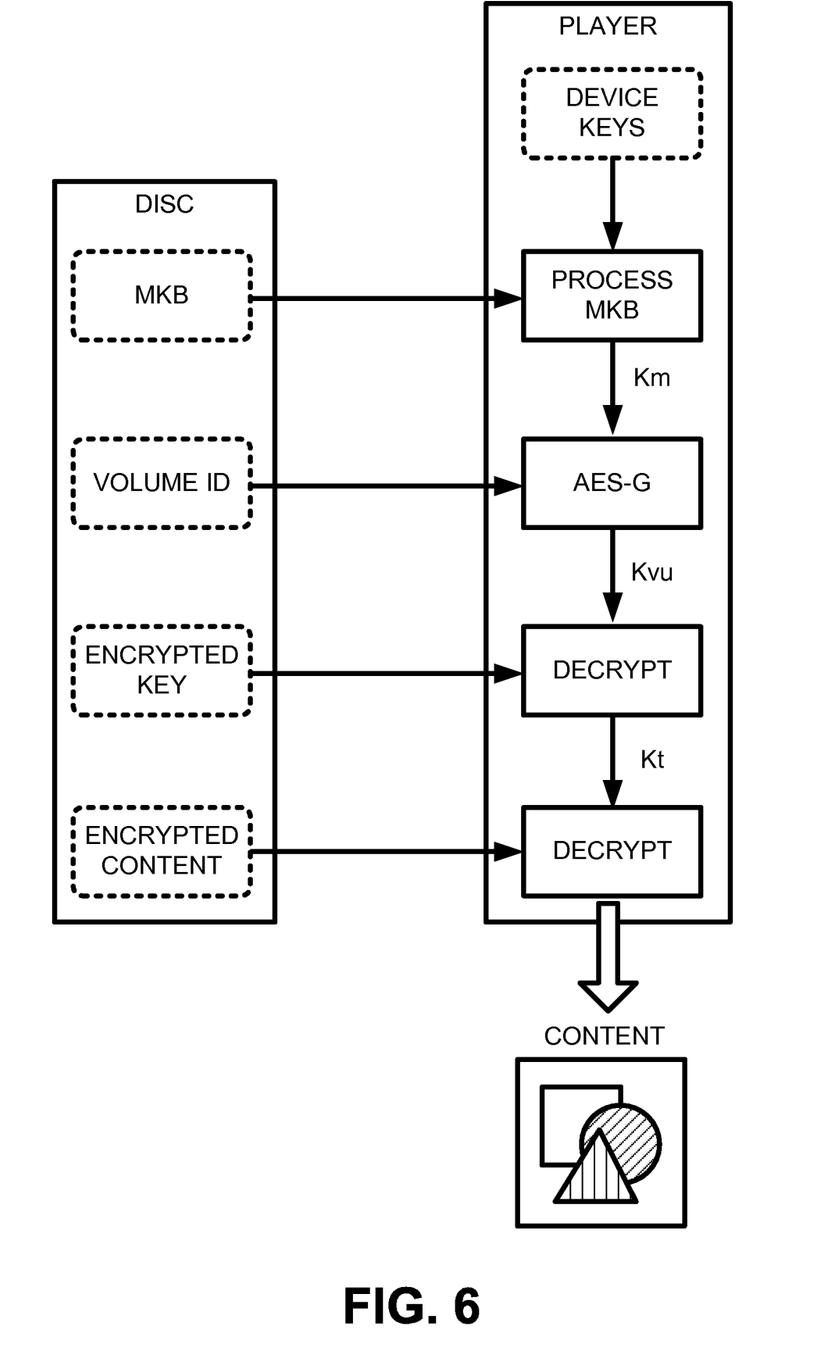
FIG. 6 illustrates a high-level diagram of the AACS protection system.

By way of background, the content on a local storage medium (such as a DVD) may generally be categorized into two categories—the main multimedia content itself and volume info relating to the disc. With reference to FIG. 6, under the AACS standard, this volume info is referred to as the Media Key Block (MKB). The MKB allows compliant players (e.g., software DVD players that have incorporated a license under the AACS LA) to calculate a "secret" key using device keys embedded into the players. The AACS scheme encrypts content under one or more title keys using the Advanced Encryption Standard (AES). These title keys are derived from a combination of a media key and other pieces of information, including the volume ID associated with the disc. Even if an unauthorized user tampers with the system and manages to retrieve one of the title keys, this only allows the user to decrypt a portion of the content. To perform secure playback of media content, the playback apparatus 102 includes a player application 110 and a hardware protection module 112 to protect against unauthorized access of the AACS keys described above. By protecting the AACS keys and processing the AACS keys in a closed, secure environment, the AACS keys are protected against tampering.

Figure 2:
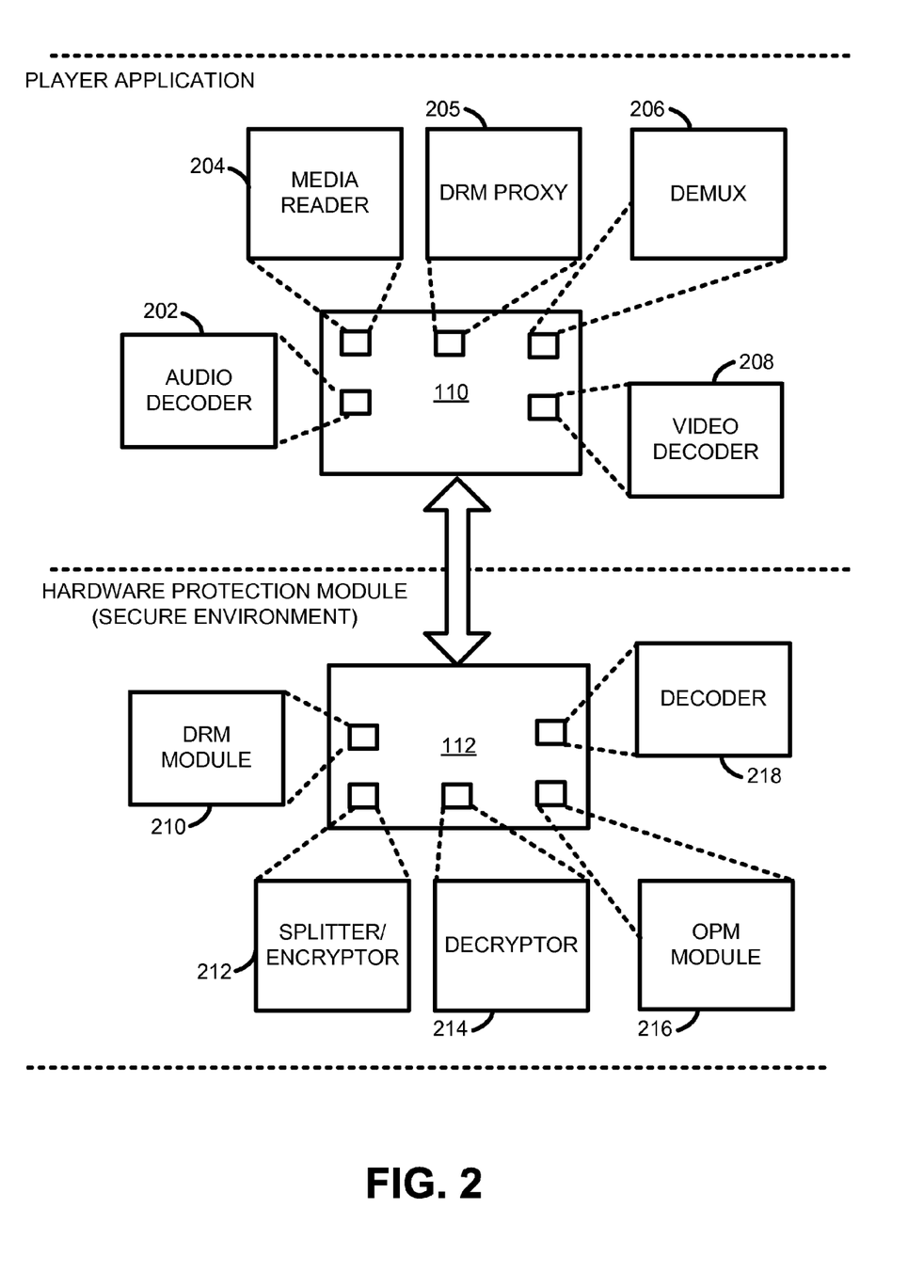
FIG. 2 depicts an embodiment for providing secure playback of media content using the playback apparatus in FIG. 1.
Figure 3:
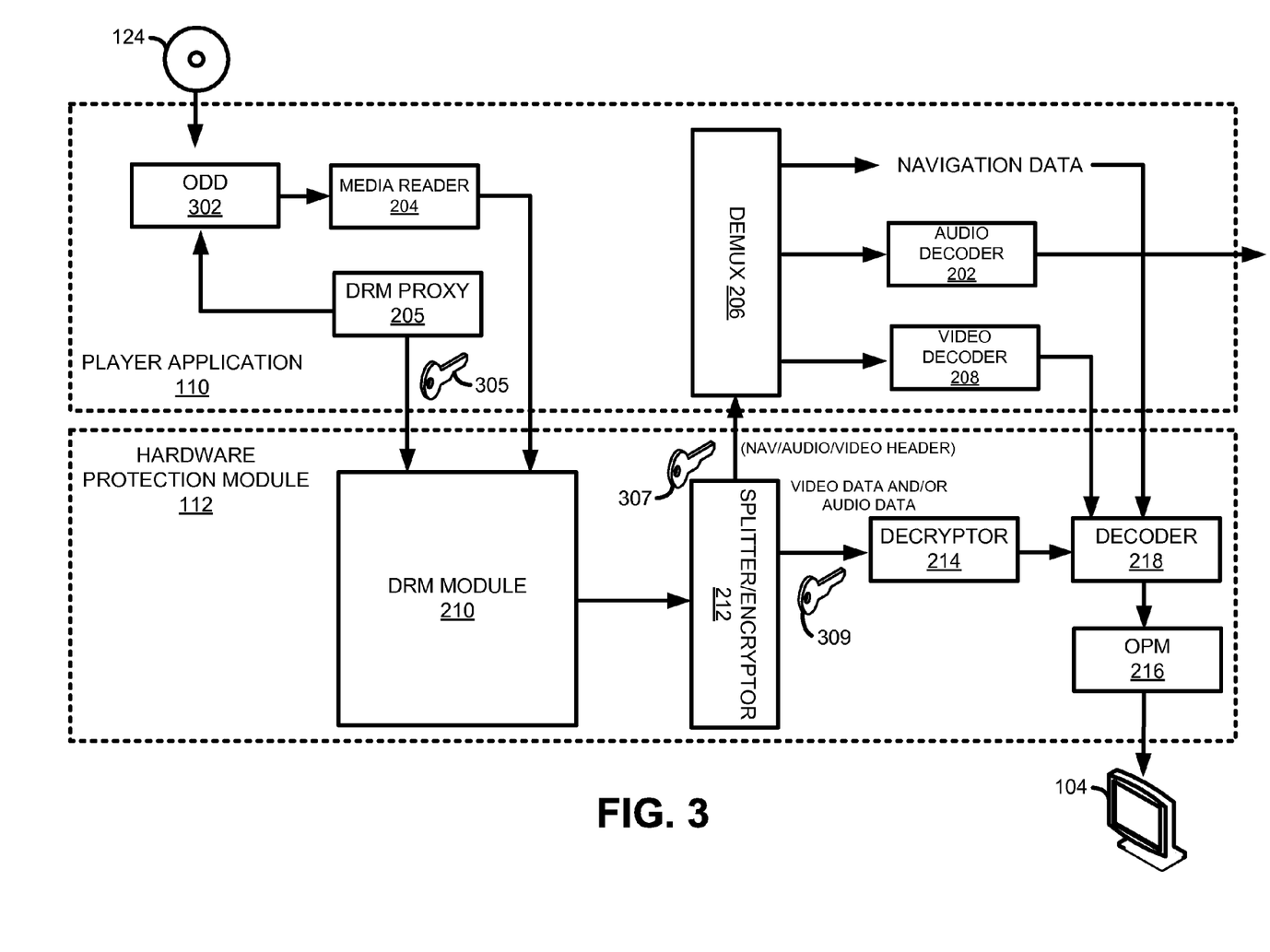
FIG. 3 illustrates the general signal flow between the components depicted in FIG. 2.

Reference is now made to FIG. 2, which depicts an embodiment for providing secure playback of media content using the playback system in FIG. 1. In particular, FIG. 2 illustrates a high-level architecture for utilizing the player application 110 in conjunction with the hardware protection module 112 described above. The player application 110 includes an audio decoder 202, a media reader 204, an DRM proxy 205, a demultiplexer 206, and a video decoder 208. The hardware protection module 112 includes a DRM module 210, a splitter/encryptor module 212, a decryptor 214, an OPM (output protection management) module 216, and a decoder 218. The player application receives the media content and forwards the AACS keys to the hardware protection module 112, which provides a secure, closed environment for decoding the media content. FIG. 3 illustrates the general signal flow between the components depicted in FIG. 2. The player application 110 may include an optical disc drive (ODD) 302 for receiving media content stored on a storage medium. As an example, the ODD 302 receives a DVD 124, which contains multimedia content and volume info relating to the disc.

The ODD 302 works in conjunction with the media reader 204, which extracts this information. The DRM proxy 205 accesses DRM information such as the media key block (MKB) from the disc 124 and encrypts the AACS device key to provide an added layer of security. In accordance with some embodiments, this step is performed using a private key 305 established between the player application 110 and the hardware protection module 112. The DRM proxy 205 forwards the encrypted AACS device key or other DRM encrypted device key to the DRM module 210 in the hardware protection module 112, where the DRM module 210 decrypts the device key using the private key 305. For some embodiments, the DRM module 210 may comprise a separate or dedicated processor that incorporates digital rights management (DRM) or some type of access control such as AACS. The DRM proxy 205 provides the DRM module 210 with the media key block (MKB) for media key calculation. The media key calculation can be performed by the DRM proxy 205 and/or the DRM module 210.

The media reader 204 provides the encrypted media content to the DRM module 210. The DRM proxy 205 also provides AACS commands that specify a key derivation procedure for decrypting the media content. Based on the AACS commands, the DRM module 210 extracts raw video data, which is forwarded to the splitter block 212. The splitter block 212 extracts navigation data in addition to audio data and video header information from the raw video stream and forwards this back to the demultiplexer 206 in the player application 110. In accordance with some embodiments, the navigation data may comprise navigation packs (NV_PCKs) found in Video Object Units (VOBUs) on DVDs. It should be noted that the splitter block 212 only forwards a portion of the video data (i.e., video header information) back to the player application 110.

The remaining video data remains in the hardware protection module 112 and is forwarded to a video decryptor 214, which decrypts the video data. In accordance with some embodiments, the portion of the raw video stream that is forwarded back to the player application 110 may be encrypted using a second key (e.g., a session key) 307 prior to be sent. The session key 307 can be generated by an authentication procedure performed between the hardware protection module 112 and the player application 110. Similarly, the portion of the raw video stream forwarded to the decryptor 214 may be encrypted using a third key 309. Note that for alternative embodiments, a portion of the audio data may also be removed from the media content by the splitter 212 and encrypted prior to being sent to the decryptor 214. In yet other embodiments, only the audio data is removed from the media content by the splitter 212 and encrypted prior to being sent to the decryptor 214. It is understood that all such variations are within the scope of the present disclosure. Referring back to the player application 110 side, the demultiplexer 206 routes the audio data and video header information to the audio decoder 202 and video decoder 208, respectively.

The decoded video header information, along with the extracted navigation data, is routed back to the hardware protection module 112, and in particular, to the decoder 218. In accordance with various embodiments, the decoder 218 outputs the decoded video content to devices that have incorporated some type of restricted access scheme such as High-bandwidth Digital Content Protection (HDCP), Analog Content Protection (ACP), or Copy Generation Management System (CGMS). Such protection may be incorporated in the OPM module 216. From the OPM module 216, the decoded video data may be routed to a display 104, such as the one depicted in FIG. 1.

Figure 4A:
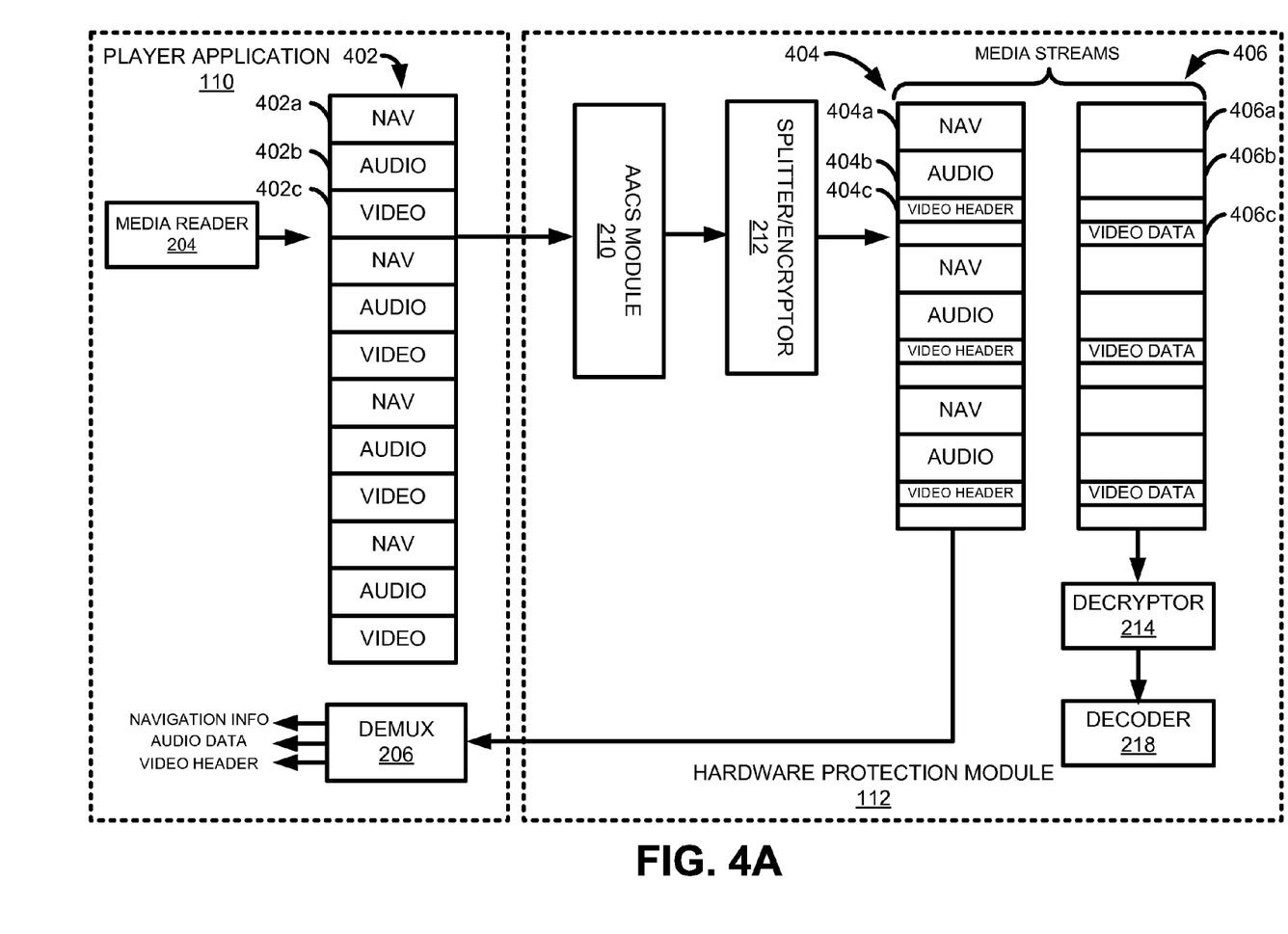
FIGS. 4A-B provide a more detailed view of the extraction process shown in FIG. 3.

FIG. 4A provides a more detailed view of the video extraction process shown in FIG. 3. Video data is a key component in the overall media playback framework and is a primary target for unauthorized copying and distribution. Media content is typically protected by some type of content protection mechanism. Before rendering the media content to a display device, the media content is often transformed from a secure environment to an insecure one, thereby making the media content vulnerable to unauthorized access. Various embodiments are thus directed to extracting the video data from the media content and processing the video data in a secure environment (e.g., the hardware protection module 112), where the video data is directly rendered to a display device.

With reference to FIG. 4A, the media reader 204 receives and forwards the encrypted raw video stream 402 to the DRM module 210 in the hardware protection module 112. The raw video stream 402 generally comprises navigation data 402a used for performing playback of the media content. The video stream 402 further comprises audio 402b and video 402c segments. Within the DRM module 210, the encrypted media content is decrypted and forwarded to the splitter 212, where the raw media content 402 is split into different output media streams 404, 406. One stream 404 comprises navigation data 404a, audio data 404b, and video header information 404c used for decoding the video data. In particular, the video header information 404c is utilized for normal playback control.

A second stream 406 comprises video data 406c. In accordance with some embodiments, padding may be appended to the output streams 404, 406 in order to maintain synchronization between the streams 404, 406. The frame portion of the video data is truncated and thus the stream length is generally shorter than the original one 402. The format of the output streams 404, 406 depends on the length of the input stream 402. In cases where the input stream 402 is of variable length, additional information regarding buffer lengths of the output streams 404, 406 is stored. In cases where the input stream 402 is of fixed length, however, no additional information is stored as the extracted video data may be simply tiled as an array.

As depicted in FIG. 4A, the first output stream 404 is routed back to the player application 402, where the demultiplexer 206 splits the stream 404 into the various components (navigation info, audio data, video header). The second output stream 406 containing the video data 406c remains in the secure environment provided by the hardware protection module 112. The stream 406 is routed to the decryptor 214 and on to the decoder 218. The video header and navigation information extracted by the demultiplexer 206 in the player application 110 is also routed to the decoder 218 for processing the video data 406c.

Figure 4B:
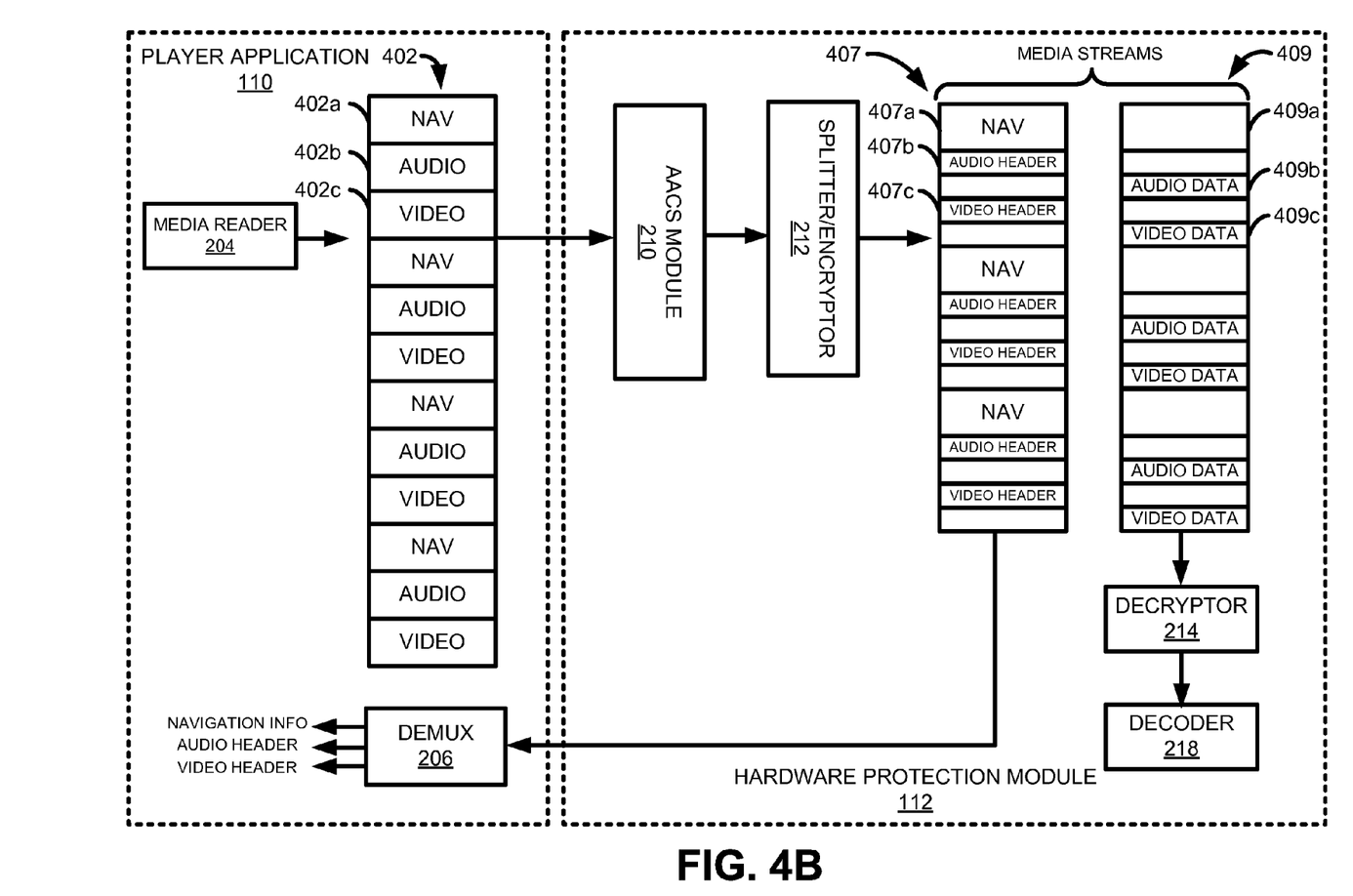

Reference 4B depicts an alternative embodiment where both video data and audio data are extracted. As described earlier, the splitter 212 may be configured to extract not only video data, but also audio data. As depicted, the raw media content 402 is split by splitter 212 into different output media streams 407, 409. One stream 407 comprises navigation data 407a, audio header information 407b, and video header information 407c used for decoding both the audio data and the video data.

A second stream 409 comprises audio data 409b and video data 409c. As described above, padding may be appended to the output streams 407, 409 in order to maintain synchronization between the streams 407, 409. The frame portion of the video data is truncated and thus the stream length is generally shorter than the original one 402. The format of the output streams 407, 409 depends on the length of the input stream 402. In cases where the input stream 402 is of variable length, additional information regarding buffer lengths of the output streams 407, 409 is stored. In cases where the input stream 402 is of fixed length, however, no additional information is stored as the extracted video data may be simply tiled as an array.

The first output stream 407 is routed back to the player application 402, where the demultiplexer 206 splits the stream 407 into the various components (navigation info, audio header, video header). The second output stream 409 containing the audio data 409b and the video data 409c remains in the secure environment provided by the hardware protection module 112. The stream 409 is routed to the decryptor 214 and on to the decoder 218. In this regard, the decryptor 214 and the decoder 218 are capable of processing both audio data and video data. Thus, the audio header, video header, and navigation information extracted by the demultiplexer 206 in the player application 110 are routed to the decoder 218 for processing the audio data 409b and video data 409c. It should again be emphasized that in yet other embodiments, the splitter 212 may be configured to remove a portion of only the audio data prior to sending the audio data to the decryptor 214.

Figure 5:
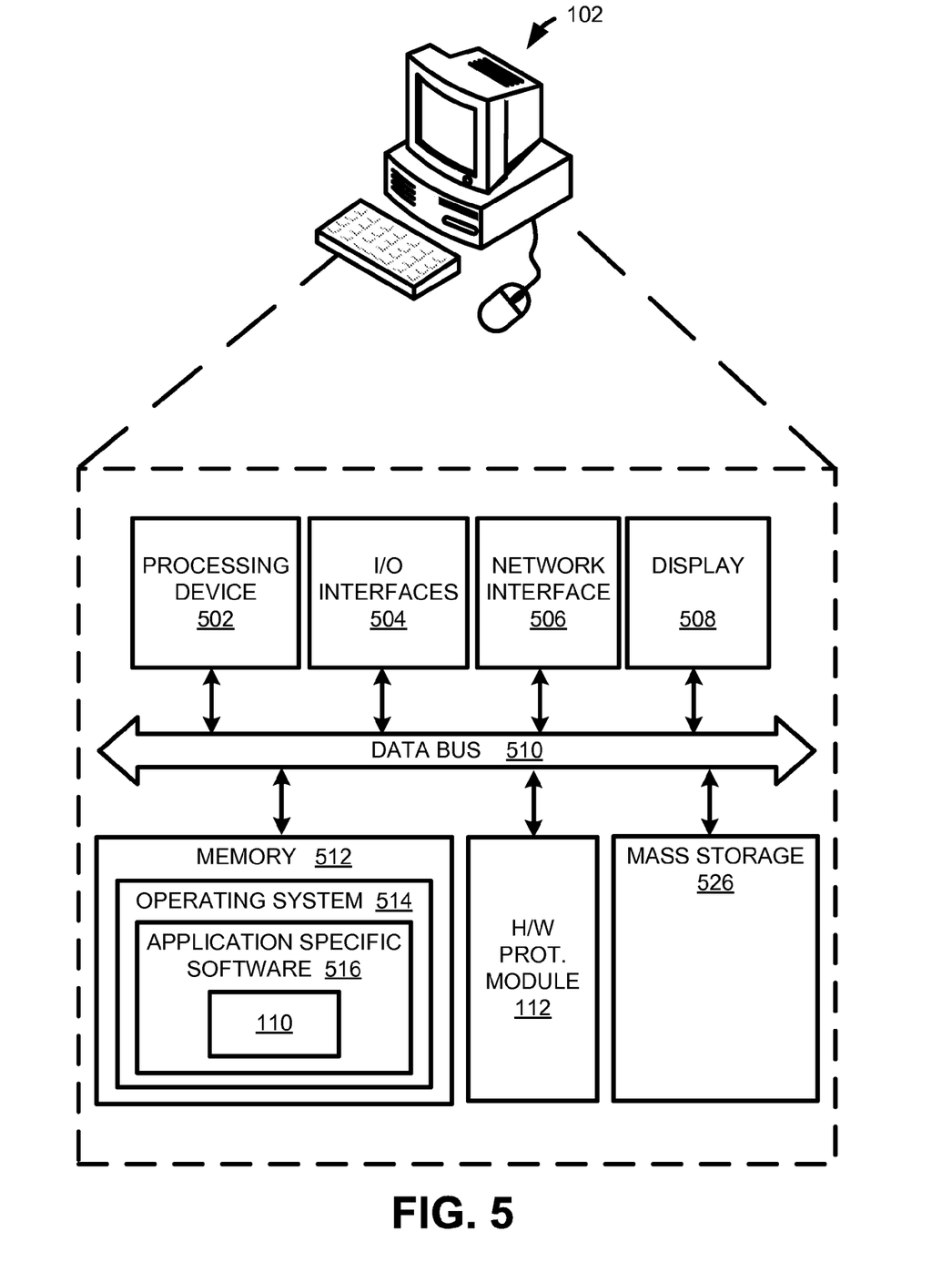
FIG. 5 illustrates an embodiment of the playback system shown in FIG. 1 for executing the various components shown in FIG. 2.

Reference is now made to FIG. 5, which illustrates an embodiment of the playback system shown in FIG. 1 for executing the various components shown in FIG. 2. Generally speaking, the playback apparatus 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the playback apparatus 102 can, for instance, comprise memory 512, a processing device 502, a number of input/output interfaces 504, a network interface 506, a display 508, the hardware protection module 112, and mass storage 526, wherein each of these devices are connected across a data bus 510.

In accordance with preferred embodiments, the hardware protection module 110 may be implemented on a graphics card or hardware incorporating one or more application specific integrated circuits (ASICs), for example. Similarly, processing device 502 can include any custom made or commercially available processor, a central processing unit (CPU) or an auxiliary processor among several processors associated with the playback apparatus 102, a semiconductor based microprocessor (in the form of a microchip), one or more ASICs, a plurality of suitably configured digital logic gates, and other well known electrical configurations comprising discrete elements both individually and in various combinations to coordinate the overall operation of the computing system.

The memory 512 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 512 typically comprises a native operating system 514, one or more native applications, emulation systems, or emulated applications for any of a variety of operating systems and/or emulated hardware platforms, emulated operating systems, etc. For example, the applications may include application specific software 516 stored on a computer readable medium for execution by the processing device 502 and may include the playback application 110 described with respect to FIG. 2. One of ordinary skill in the art will appreciate that the memory 512 can, and typically will, comprise other components which have been omitted for purposes of brevity.

Input/output interfaces 504 provide any number of interfaces for the input and output of data. For example, where the playback apparatus 102 comprises a personal computer, these components may interface with user input device 504, which may be a keyboard or a mouse, as shown in FIG. 1. Where the playback apparatus 102 comprises a handheld device (e.g., PDA, mobile telephone), these components may interface with function keys or buttons, a touch sensitive screen, a stylist, etc. Display 508 can comprise a computer monitor or a plasma screen for a PC or a liquid crystal display (LCD) on a hand held device, for example.

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, or device. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

With further reference to FIG. 5, network interface device 506 comprises various components used to transmit and/or receive data over a network environment. By way of example, the network interface 506 may include a device that can communicate with both inputs and outputs, for instance, a modulator/demodulator (e.g., a modem), wireless (e.g., radio frequency (RF)) transceiver, a telephonic interface, a bridge, a router, network card, etc.). The playback apparatus 102 may further comprise mass storage 526. For some embodiments, the mass storage 526 may include a database 528 to store and manage data. Such data may comprise, for example, editing files which specify special effects for a particular movie title.

Figure 7:
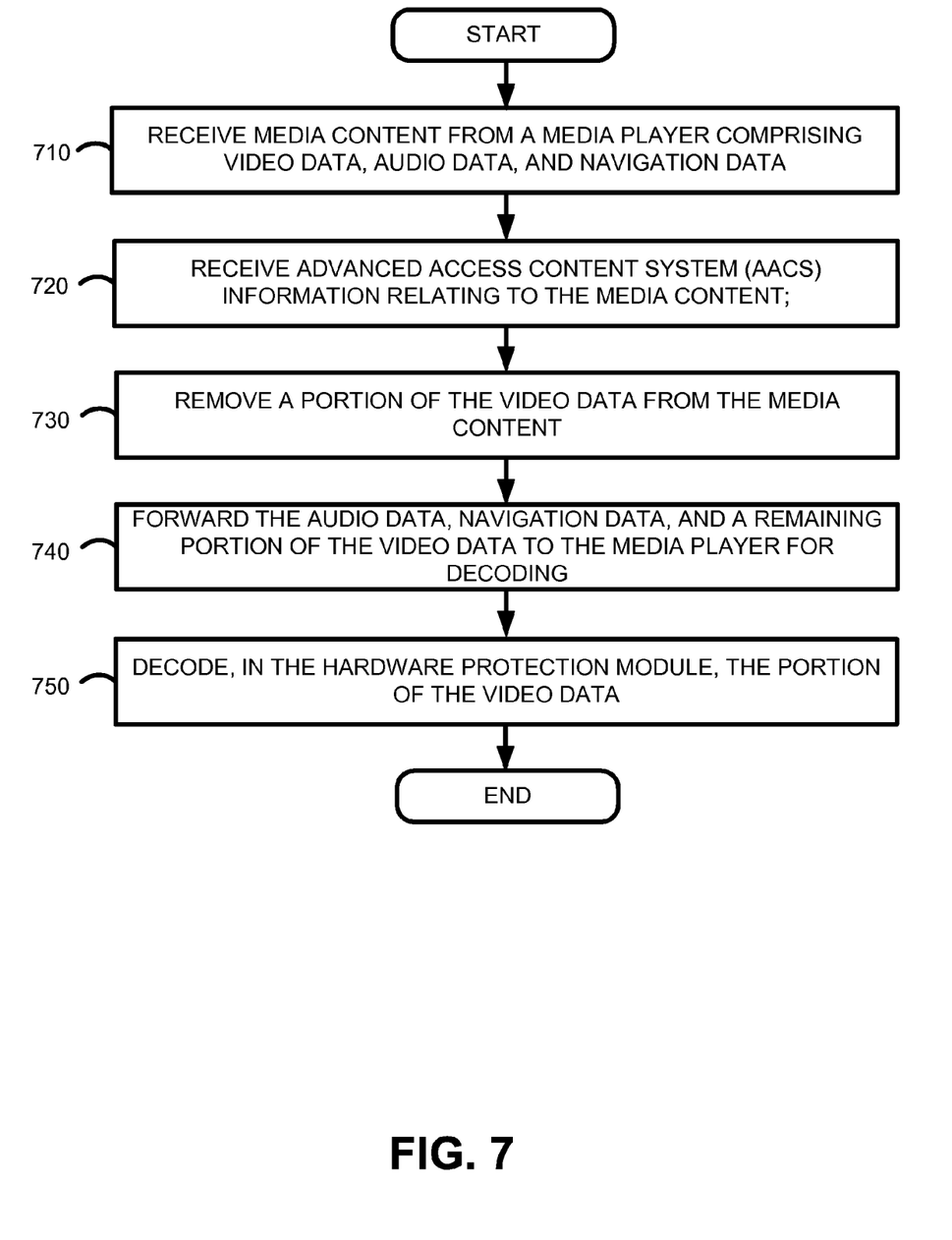
FIG. 7 is an embodiment for performing secure playback of media content.

Reference is now made to FIG. 7, which is an embodiment for performing secure playback of media content. Such embodiments may be performed in a distributed configuration across a player application and a hardware protection module, which provides a secure, closed environment for processing a portion of the media content. Block 710 begins by receiving media content from a media player comprising video data, audio data, and navigation data. In accordance with some embodiments, the media content may be read from a storage medium such as a DVD, for example.

In block 720, Advanced Access Content System (AACS) information relating to the media content is received. Such AACS information may include an AACS device key and a Media Key Block (MKB) associated with the received media content. In block 730, a portion of the video data is removed from the media content. The video data is partitioned such that a portion of the video is forwarded to a player application for processing while a remaining portion is decoded in the hardware protection module. Note that as described earlier, a portion of the audio data may also be removed from the media content. In block 740, the audio data, navigation data, and a remaining portion of the video data is forwarded back to the media player for decoding of this portion. In block 740, the portion of the video data not forwarded back to the player application is decoded locally, in the hardware protection module.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for performing secure playback of video in a hardware protection module, comprising:
   receiving media content from a media player, the media content comprising video segments, audio data, and navigation data, where each video segment comprises video header information and video data;
   receiving digital rights management (DRM) information relating to the media content;
   extracting a portion of the video segments from the media content;
   forwarding the navigation data, and a remaining portion (video-header) of the video segments to the media player for decoding, wherein the remaining portion comprises the video header information and the audio data, and wherein the remaining portion excludes the video data; and
   decoding, in the hardware protection module, the extracted portion of the video segments.

2. The method of claim 1, further comprising:
   removing the audio data from the media content; and
   decoding, in the hardware protection module, the audio data.

3. The method of claim 1, wherein receiving DRM information comprises:
   receiving an Advanced Access Content System (AACS) device key;
   receiving Media Key Block (MKB) data for decrypting the encrypted AACS device key; and
   decrypting, in the hardware protection module, the encrypted AACS device key.

4. The method of claim 3, wherein the MKB data is derived by a DRM proxy in the media player.

5. The method of claim 3, wherein the AACS device key is encrypted using a key established between the media player and the hardware protection module.

6. The method of claim 1, wherein the received media content is stored on a DVD, and wherein the navigation data comprises navigation packs (NV_PCK) in video object units (VOBU).

7. The method of claim 1, further comprising:
receiving the navigation data and decoded video header information; and
based on the received navigation data and the decoded video header information, decoding the portion of video segments, the portion of video segments comprising video data.

8. The method of claim 7, further comprising:
routing the decoded video data through an output protection management (OPM) module; and
at the output of the OPM module, outputting the decoded video data to a display device.

9. The method of claim 8, wherein the OPM module utilizes at least one of: High-bandwidth Digital Content Protection (HDCP), Analog Content Protection (ACP), and Copy Generation Management System (CGMS).

10. The method of claim 8, wherein forwarding the audio data, navigation data, and a remaining portion of the video segments to the media player comprises encrypting the audio data, navigation data, and the remaining portion of the video segments using a predetermined key established between the media player and the hardware protection module.

11. The method of claim 1, further comprising:
forwarding the audio data to the media player for decoding.

12. The method of claim 1, wherein forwarding the navigation data, and a remaining portion of the video segments to the media player comprises encrypting the navigation data, and the remaining portion of the video segments using a predetermined key established between the media player and the hardware protection module.

13. The method of claim 1, wherein removing a portion of the video segments from the media content comprises encrypting the portion of the video segments and encrypting a remaining portion of the video segments.

14. A system for performing secure playback of video, comprising:
a media player configured to receive media content and digital rights management (DRM) information relating to the media content, wherein the media player comprises:
a media reader for reading the media content comprising video segments, audio data, and navigation data, wherein each video segment comprises video header information and video data;
a demultiplexer for partitioning an input media stream to generate an output comprising the navigation data, the audio data, and the video header information; and
a video decoder for decoding the video header information;
a hardware protection module for receiving the media content and returning only a portion of the media content to the media player for decoding, wherein the returned portion comprises the audio data, the navigation data, and the video header information, wherein the returned portion excludes the video data.

15. The system of claim 14, wherein the hardware protection module comprises:
a DRM module for receiving media content from the media reader;
a splitter for removing and forwarding the portion of the media content to the demultiplexer; and
a decoder for receiving the video header information from the decoder to decode the remaining portion of media content.

16. The system of claim 15, wherein the splitter for removing and forwarding the portion of the media content is further configured to encrypt the media content prior to forwarding the portion of the media content to the demultiplexer.

17. The system of claim 16, wherein the splitter is further configured to encrypt a remaining portion of the media content not forwarded to the demultiplexer, wherein the remaining portion of the media content comprises raw video data.

18. The system of claim 15, wherein the splitter is configured to remove and forward a portion of the video segments and the audio data to the demultiplexer.

19. The system of claim 14, wherein the DRM module in the hardware protection module is configured to:
receive an Advanced Access Content System (AACS) device key and Media Key Block (MKB) data from the media player; and
decrypt, in the hardware protection module, the encrypted AACS device key using the AACS device key.

20. A system for performing distributed playback of media content, comprising:
a program stored on a computer readable medium for receiving media content and digital rights management (DRM) information relating to the media content, wherein the program is configured to perform playback of the media content, wherein the media content comprises video segments, audio data, and navigation data, and wherein each video segment comprises video header information and video data; and
a hardware protection module configured to receive the media content, decrypt the media content, and return only a portion of the media content back to the program for playback of the audio portion, wherein the returned portion comprises the video header information and the audio data which have been separated from the received media content, wherein the returned portion excludes the video data;
wherein the hardware protection module is further configured to perform playback of the video data of the media content, wherein the video data is extracted from the media content.

21. The system of claim 20, wherein the program comprises:
logic for reading the media content;
logic for receiving digital rights management (DRM) information relating to the media content;
logic for partitioning an input media stream to generate an output comprising the navigation data, the audio data, and the video header information; and
decoder logic for decoding the video header information.

22. The system of claim 21, wherein the hardware protection module comprises:
a splitter for removing and forwarding the portion of the media content to the logic for partitioning; and
a decoder for receiving the navigation data and video header information from the decoder logic to decode the remaining portion of media content.

23. The system of claim 22, wherein the hardware protection module comprises a DRM module configured to receive an Advanced Access Content System (AACS) device key and Media Key Block (MKB) data from the program, wherein the DRM module is further configured to decrypt the encrypted AACS device key using the AACS device key.

* * * * *